United States Patent
Novosel et al.

(10) Patent No.: US 6,336,059 B1
(45) Date of Patent: Jan. 1, 2002

(54) REACH-MEASUREMENT METHOD FOR DISTANCE RELAYS AND FAULT LOCATORS ON SERIES-COMPENSATED TRANSMISSION LINES USING LOCAL INFORMATION

(75) Inventors: Damir Novosel, Cary, NC (US); Bernhard Bachmann, Bielefeld (DE); Yi Hu, Cary; David G. Hart, Raleigh, both of NC (US); Murari M. Saha, Västerås (SE)

(73) Assignee: ABB Power T&D Company Inc., Raleigh, NC (US)

( * ) Notice: Subject to any disclaimer, the term of this patent is extended or adjusted under 35 U.S.C. 154(b) by 0 days.

(21) Appl. No.: 09/192,956

(22) Filed: Nov. 17, 1998

(51) Int. Cl.⁷ .............................................. G05B 19/00
(52) U.S. Cl. ........................ 700/292; 700/286; 361/16; 361/80
(58) Field of Search ............................... 700/286, 292; 361/16, 80

(56) References Cited

U.S. PATENT DOCUMENTS

| | | | |
|---|---|---|---|
| 4,652,963 A | * 3/1987 | Fahlen | 361/16 |
| 4,812,995 A | * 3/1989 | Girgis et al. | 364/481 |
| 4,841,405 A | * 6/1989 | Udren | 361/80 |
| 4,868,704 A | * 9/1989 | Cavero | 361/80 |
| 5,072,403 A | * 12/1991 | Johns | 364/492 |
| 5,325,259 A | * 6/1994 | Paulsson | 361/128 |
| 5,349,490 A | 9/1994 | Roberts et al. | 361/80 |
| 5,365,396 A | 11/1994 | Roberts et al. | 361/80 |
| 5,455,776 A | * 10/1995 | Novosel | 364/492 |
| 5,515,227 A | 5/1996 | Roberts et al. | 361/67 |

OTHER PUBLICATIONS

A.D. McInnes and I.F. Morrison, "Real Time Calculation of Resistance and Reactance for Transmission Line Protection by Digital Computer," *Elec. Eng. Trans.*, IE, Australia, vol. EE7, No. 1, pp. 16–23.

"Microprocessor Relays and Protection Systems," *IEEE Tutorial Course*, 88EH0269–I–PWR, 1986.

Damir Novosel et al., "Algorithms For Locating Faults On Series Compensated Lines Using Neural Network and Deterministic Methods," 96WM 021–6 PWRD,—Approved for presentation at the 1996 IEEE/PES Winter Meeting, Jan. 21–25, 1996, Baltimore, MD.

Damir Novosel et al., "Locating Faults On Series Compensated Lines Using Intelligent Methods," *Eng. Int. Syst.* vol. 5, No. 4, Dec. 1997, pp. 259–264.

* cited by examiner

Primary Examiner—William Grant
Assistant Examiner—Sheela Rao
(74) Attorney, Agent, or Firm—Woodcock Washburn Kurtz Mackiewicz & Norris

(57) ABSTRACT

A reach-measurement method is used in connection with a series-compensated line of a power system. The series-compensated line includes an installed series capacitance having a bus side and a line side, and a non-linear protection device parallel to the installed series capacitance. The series-compensated line has a line current, a bus side voltage, and a line side voltage. The series capacitance and the non-linear protection device have a capacitance voltage thereacross equal to the bus side voltage minus the line side voltage. In the method, a number (n) of line current samples are measured, where such samples are representative of values of a line current waveform at successive instants of time on the series-compensated line. Capacitance voltage values are computed based on the measured line current samples in accordance with an equation which takes into account the non-linear protection device parallel to the installed series capacitance. A prescribed power system function is then performed based on the computed capacitance voltage values.

21 Claims, 2 Drawing Sheets

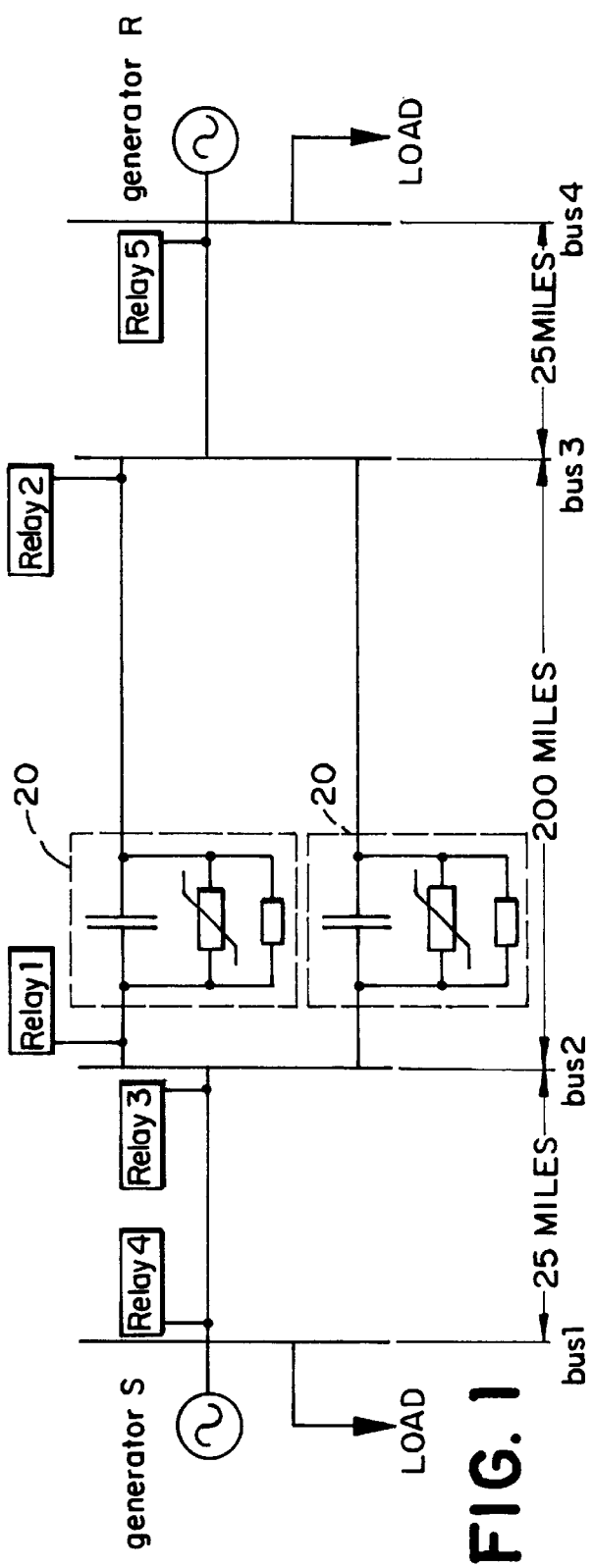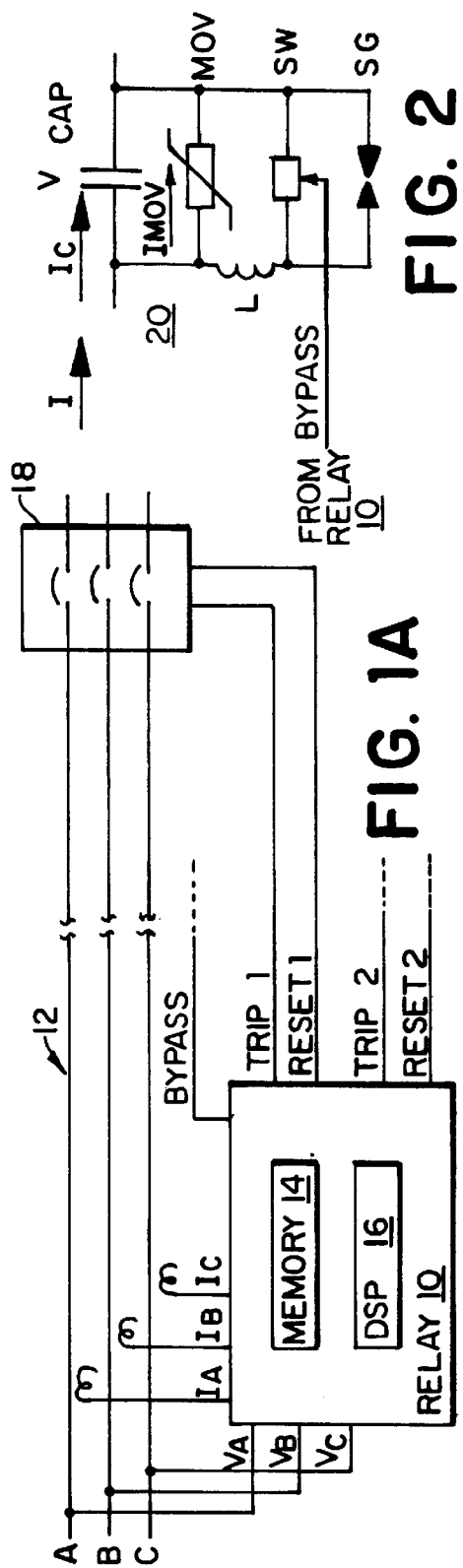

REACH-MEASUREMENT METHOD FOR DISTANCE RELAYS AND FAULT LOCATORS ON SERIES-COMPENSATED TRANSMISSION LINES USING LOCAL INFORMATION

FIELD OF THE INVENTION

The present invention relates generally to protective relaying in a power distribution system, and more particularly to a method for use in connection with a protective relay or like device to provide an accurate reach measurement method.

BACKGROUND OF THE INVENTION

In a power distribution system, electrical transmission lines and power generation equipment must be protected against faults and consequent short circuits. Otherwise, such faults and short circuits can cause a collapse of the system, equipment damage, and/or personal injury. Accordingly, and as shown in FIG. 1, a typical power system employs one or more protective relays to monitor system conditions on a protected transmission line, to sense faults and short circuits on such protected line, and to appropriately isolate such faults and short circuits from the remainder of the power system by tripping pre-positioned circuit breakers on such protected line.

As seen, a typical power system can be connected over hundreds of miles and include multiple power generators (generator S, generator R) at different locations. Transmission lines (the main horizontal lines in FIG. 1) distribute power from the generators to secondary lines or buses (the main vertical lines in FIG. 1), and such buses eventually lead to power loads. Importantly, relays and circuit breakers are appropriately positioned to perform the isolating function described above.

A modern protective relay typically measures and records voltage and current waveforms on a corresponding protected line, and employs a microprocessor and/or digital signal processor (DSP) to process the recorded waveforms. As used herein, the term 'transmission line' includes any type of electrical conductor, such as high power conductors, feeders, etc. Based on the processed waveforms, the protective relay can then decide whether to trip an associated relay, thereby isolating a portion of the power system.

In particular, and referring now to FIG. 1A, it is seen that a typical protective relay 10 samples voltage and current waveforms $V_A$, $V_B$, $V_C$, $I_A$, $I_B$, $I_C$ from each phase (A–C) of a three phase line 12. Of course, greater or lesser numbers of phases in a line may be sampled. The sampled waveforms are stored in a memory 14 and are then retrieved and appropriately operated on by a processor or DSP 16 to produce estimated impedances and phasors. As should be understood, such impedances and phasors are employed to determine whether a fault condition exists, and if so to estimate fault location.

Based on the estimated impedances and phasors, then, the relay 10 may decide that an associated circuit breaker 18 should be tripped to isolate a portion of the line 12 from a fault condition or from other detected phenomena, and issue such a command over a 'TRIP' output ('TRIP 1' in FIG. 1A) that is received as an input to the circuit breaker 18. The relay 10 may then reset the circuit breaker after the relay 10 senses that the fault has been cleared, or after otherwise being ordered to do so, by issuing such a command over a 'RESET' output ('RESET 1' in FIG. 1A) that is received as an input to the circuit breaker 18.

Notably, the relay 10 may control several circuit breakers 18 (only one being shown in FIG. 1A), hence the 'TRIP 2' and 'RESET 2' outputs. Additionally, the circuit breakers 18 may be set up to control one or more specific phases of the line 12, rather than all of the phases of the line 12. Owing to the relatively large distances over which a power system can extend, the distance between a relay 10 and one or more of its associated circuit breakers 18 can be substantial. As a result, the outputs from the relay 10 may be received by the circuit breaker(s) 18 by way of any reasonable transmission method, including hard wire line, radio transmission, optical link, satellite link, and the like.

As seen in FIGS. 1 and 2, transmission lines are oftentimes series-compensated by series capacitance in the form of one or more capacitors or banks of capacitor installations (a representative series capacitor CAP is shown). Benefits obtained thereby include increased power transfer capability, improved system stability, reduced system losses, improved voltage regulation, and better power flow regulation. However, such installation of series capacitance introduces challenges to protection systems for both the series-compensated line and lines adjacent thereto.

Typically, and as best seen in FIG. 2, installed series capacitance includes a metal oxide varistor (MOV) or other non-linear protection device in parallel with the series capacitance (CAP), which limits the voltage across the capacitance in a pre-defined maimer. Additionally, a bypass breaker or bypass switch (SW) is installed in parallel with the series capacitance, which closes at some point following operation of the MOV. Typically, and as seen, the breaker is controlled by a protective relay 10 via an appropriate BYPASS output (FIG. 1A). Conduction through the MOV and the closing of such breaker introduce transients in the system as the impedance seen by the protective relay is altered. The quick response of the MOV, the breaker, and the spark gap (SG) installed in parallel with the series capacitance removes or reduces the capacitance and limits the impact of the transient.

Protection of a power distribution system with one or more series compensated lines is considered to be one of the most difficult tasks both for relay designers and utility engineers. A protective relay should be designed to have a high level of security and dependability. A utility engineer should be able to set the protection properly. However, protection settings depend on prevailing system conditions and system configuration, and both may change significantly if series capacitors are present in the system. In particular, such changes result from the fact that series compensation elements installed within a power system introduce harmonics and non-linearities in such system, arising from the aforementioned MOV, bypass switch, spark gap, and other elements. A protective relay or like device must therefore have an accurate reach-measure scheme to take proper action, especially in view of the changes resulting from installed series capacitance and its related elements.

SUMMARY OF THE INVENTION

In the present invention, an accurate reach-measurement scheme improves the reach-measurement of impedance relays and the fault location estimation using local information only. The improvement is accomplished by numerically solving the ordinary differential equation that describes the series installed capacitance installation. The scheme is simple and accurate and requires only local voltage and current at the bus. Furthermore, the scheme easily adapts to different series installed capacitance installations and operation of the installed capacitance protection, and is independent of surrounding power system elements. Existing numerical relays can easily incorporate the new reach-measurement scheme in their protection functions so that such improvement is achieved on a minimal cost basis.

In particular, in the present invention, a reach-measurement method is used in connection with a series-compensated line of a power system. The series-compensated line includes an installed series capacitance having a bus side and a line side, and a non-linear protection device parallel to the installed series capacitance. The series-compensated line has a line current, a bus side voltage, and a line side voltage. The series capacitance and the non-linear protection device have a capacitance voltage thereacross equal to the bus side voltage minus the line side voltage.

In the method, a number (n) of line current samples are measured, where such samples are representative of values of a line current waveform at successive instants of time on the series-compensated line. Capacitance voltage values are computed based on the measured line current samples in accordance with an equation which takes into account the non-linear protection device parallel to the installed series capacitance. A prescribed power system function is then performed based on the computed capacitance voltage values.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is a diagrammatic view of a power distribution system having protective relays which perform reach measurement in accordance with a preferred embodiment of the present invention;

FIG. 1A is a diagrammatic view of a relay employed in connection with the power system shown in FIG. 1, where the relay is coupled to a circuit breaker in accordance with a preferred embodiment of the present invention;

FIG. 2 is a diagrammatic view of a representative series capacitor and related elements employed in connection with the power system shown in FIG. 1;

DETAILED DESCRIPTION OF PREFERRED EMBODIMENTS

Figure 3:
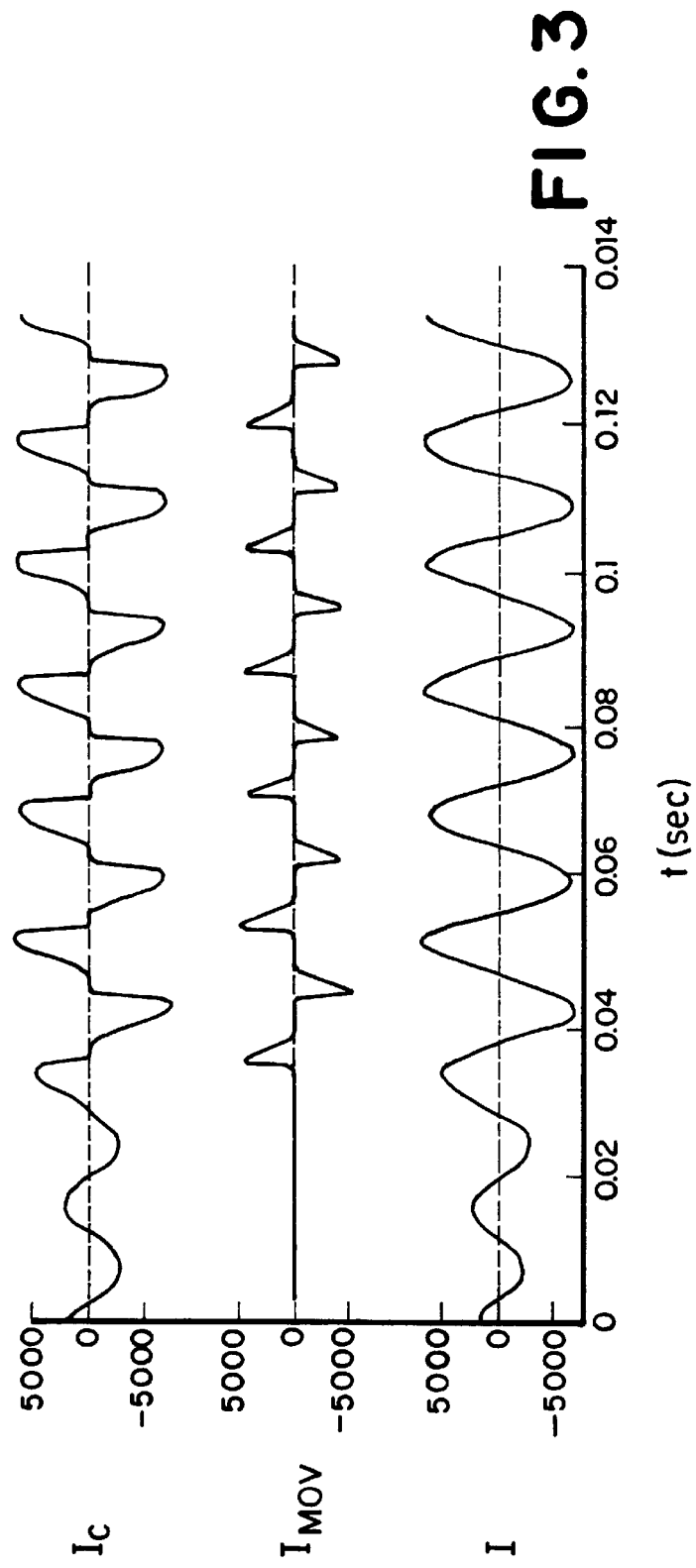
FIG. 3 is a timing diagram showing line currents through the representative series capacitor and other elements shown in FIG. 2.

The following detailed description of presently preferred embodiments of the invention considers reach measurement in connection with a transmission line. In particular, the present invention includes a new algorithm for such reach measurement. However, such algorithm is not restricted to use in connection with a transmission line and may instead be employed in connection with other power system elements without departing from the spirit and scope of the present invention.

Overview

The present invention provides an improved method for reach-measurement by distance relays and fault locators applied in series compensated lines. Furthermore, the method is independent of the particular device parameters and surrounding power system elements. The new reach-measurement scheme consists of two parts. The first part is a method for estimating the voltage across the series capacitance using only the measured line current. This part can be accomplished by an Ordinary Differential Equation (ODE) method together with a linear approximation of MOV characteristics, and can be implemented in combination with existing protection methods. The second part is a method for calculation of energy accumulation to predict overload protection operation. When the overload protection operates, the series capacitance is by-passed. This is important for the estimation of the voltage across the series capacitance. This method allows an estimate of bypass time without any additional information. To calculate energy accumulation, the VI-characteristic of a metal oxide varistor (MOV) placed in parallel with the series capacitance is modeled by a piece-wise linear function.

The Ordinary Differential Equation (ODE) Method

The ODE method models the voltage across the series capacitance and its protection scheme by directly solving the corresponding nonlinear ordinary differential equation. For this, the measured current data at the bus side of the series capacitance is needed. Afterwards, the voltage at the line side can be determined (i.e., "reach-measured") by using the measured voltage data at the bus side in conjunction with the calculated voltage across the capacitance. Conventional relaying algorithms for the fault detection and fault location estimation can be improved based on the reach-measured line side voltage.

To solve the nonlinear ordinary differential equation, the data sampling rate (i.e., the size of the time step Δt) has to be chosen based on the selected numerical solution scheme. The time step Δt required may be smaller than the sampling rate of the protection device or may be too small for the practical application. In the ODE method of the present invention, an appropriate interpolation scheme between two samples is employed.

As was discussed above, FIG. 2 shows a modeled series capacitance installation. In the present invention, the voltage and current relationship of such capacitance is given by the ordinary differential equation:

$$\frac{dV(t)}{dt} = \frac{1}{C}I_c(t), V(0) = V_0, \text{ and } C = -\frac{1}{\omega X_c}. \tag{1}$$

When the MOV is conducting the current at the installed capacitance is determined by the measured current I and the current through the MOV $I_{MOV}$. The MOV current is a highly nonlinear, exponential function of the voltage V(t) across the installed capacitance, but varies with such voltage in a known and defined manner such that $I_{MOV}$ is a function of V(t). A linear approximation of the MOV VI-characteristics will be described below. Incorporating this relationship into eq. (1) results in:

$$\frac{dV(t)}{dt} = \frac{1}{C}(I(t) - I_{MOV}(V(t))). \tag{2}$$

Implicit as well as explicit numerical schemes for integrating the ordinary differential equation (eq. (2)) have been investigated. Implicit schemes require considerable computational work for each time step Δt due to the nonlinear VI-characteristic of the MOV. However, such implicit schemes allow for a larger time step Δt. Numerical experiments show that explicit schemes are preferred, because the required smaller time steps Δt are not as time consuming as the solution process of the nonlinear equations. In order to discretize eq. (2), an explicit Euler scheme has been used. As mentioned above, the constant time step Δt is given by the selected sampling rate.

Using the abbreviations $V_k = V(t_k)$, $I_k = I(t_k)$, and $t_k = k \Delta t$ for k=0, . . . , n, an iterative equation (using the Euler method) to calculate the voltage across the installed capacitance is:

$$V_{k+1} = V_k + \frac{\Delta t}{C}(I_k - I_{MOV}(V_k)). \tag{3}$$

The exponential VI-characteristic of the MOV causes the explicit Euler scheme given by eq. (3) to be very sensitive and unstable for large time steps Δt. If the sampling rate is smaller than 64 samples per cycle, the explicit schemes are not able to integrate eq. (2). Therefore, an appropriate interpolation technique has to be chosen to accommodate the required integration step to the practical sampling rate of the relay.

The theoretical background for such interpolation scheme is based on the fact that the line current I (as seen in FIGS. 2 and 3) is always a sinusoidal shape regardless of whether the MOV is conducting. This is due to the existence of the line inductive impedance. As shown in FIG. 3, even though the installed capacitance current $I_C$ and the MOV current $I_{MOV}$ are extremely non-sinusoidal after MOV starts to conduct (post-fault), the line current I still maintains the sinusoidal waveform shape. Such shape allows the linear interpolation of the line current to be performed.

In the present invention, the following algorithm is employed to improve the proposed Euler integration technique. In particular, at each time step Δt, the calculation described below is performed:

Let τ=Δt/m be the new chosen time step and $v_r = v(t_k + r\tau)$ be the voltage between two measured samples of the line current, where r=0, . . . , m. From this definition: $V(t_k) = v_0$ and $V(t_{k+1}) = V_m$. For r=0, . . . , m−1, the numerical solution of eq. (2) is now calculated by using eq. (3) in conjunction with the small time step τ. Since no measurements of the current I exists between the two samples at the beginning and end of a Δt, a linear interpolation scheme is used:

$$v_{r+1} = v_r + \frac{\tau}{C}\left(\frac{r}{m}I_{k+1} + \left(1 - \frac{r}{m}\right)I_k - I_{MOV}(v_r)\right), \ v_0 = V_k. \tag{4}$$

Eq. (4) and the overall algorithm discussed above provide an efficient and accurate method to calculate the apparent voltage across the installed capacitance and MOV. In addition, such calculated apparent voltage allows the calculation of the current through the MOV $I_{MOV}$ at each time step τ, which in turn allows the overload protection of the MOV to be modeled by calculating and accumulating the energy developed across the MOV. By modeling such overload protection, the time when the bypass breaker short circuits the installed capacitance may be accurately estimated.

The initial value of the voltage across the installed capacitance $V_0$ has to be computed to start the algorithm set forth above. Accurate calculation of such initial value is only possible for the steady state condition that exists when the MOV is not conducting. For this case, the discrete Fourier transformation (DFT) can be used to determine the initial voltage. For the steady state condition, the current is given by:

$$I(t) = A \sin(\omega t + \Phi), \tag{5}$$

where A and Φ are determined using DFT. Based on eq. (5) the initial voltage $V_0$ at the installed capacitance at time $t_0$ is:

$$V_0 = V(t_0) = X_c A \sin\left(\omega t_0 + \Phi + \frac{\pi}{2}\right) = X_c A \sin\left(\Phi + \frac{\pi}{2}\right). \tag{6}$$

Linear Approximation of the MOV Characteristic

Although the current $I_{MOV}$ through the MOV can be modeled in eq. (4) by a piecewise exponential function, such model is relatively slow in that a relatively large computational time is needed for each step if such function is used. Thus a relatively fast model of the MOV VI-characteristic is needed for the purpose of relaying.

In particular, in the aforementioned piecewise exponential function, given a subdivision $[v_0=0, \ldots, v_s, \infty]$ for the voltage axis (where s is the number of subdivisions), the analytical representation of the current $I_{MOV}$ through the MOV is defined by:

$$I_{MOV} = k_r V_n^{\alpha_r}, \text{ with } V_n = \frac{V}{V_{pl}}. \tag{7}$$

The coefficient $k_r$ and $\alpha_r$ are determined by the interval condition $V_n \in [v_r, v_{r+1}]$. $V_{pl}$ is the protective voltage level of the MOV, and is usually selected to be $1.414 X_c I_{pl}$, where $I_{pl}$ is 2–3 times the maximum load current. Because the resulting subdivisions are not equidistant, the corresponding interval and the exponential expression in eq. (7) have to be computed in order to estimate the current $I_{MOV}$ through the MOV. The cumulative effect of each computation is thus very time consuming.

In the present invention, to improve and accelerate the computation of the MOV current $I_{MOV}$, the maximum voltage $V_{max}$ across the installed capacitance and MOV. normalized by $V_{pl}$ is predetermined ($V_{max}<3$). Then, an equidistant subdivision of the interval $[v_0=0, \ldots, v_m=V_{max}]$ is chosen, where the interval points $v_k$ are defined as $v_k = k \Delta_v$ for k=0, . . . , m. For each interval point $v_k$, the current $I_k = I_{MOV}(v_k)$ is calculated using eq. (7) and the resulting data array is stored in a memory. With such data array, the current through the MOV $I_{MOV}$, for all possible voltages across the installed capacitance and MOV can be computed by the following equation:

$$V_n = \frac{V}{V_{pl}}, \tag{8}$$

$$s = \frac{V_n}{\Delta v},$$

-continued $$r = \lfloor s \rfloor, \text{ and}$$

$$I_{MOV} = (s-r)I_r + (r+1-s)I_{r+1}.$$

where r is a first integer number smaller than s.

The computational time needed to execute eq. (8) does not depend on the number of subdivisions, so that the only limitation of the algoritlhm is the size of the storage for the current array. Experimental results show that Δv=0.02 results in a very good approximation of the actual VI-characteristics. The corresponding current array to be stored is less than 150 data-points.

Simulation of Energy Accumulation in MOV

The MOV has its own protection scheme, which is based on the energy accumulation. The voltage at the MOV and the current through the MOV are calculated, at each time step using the linearized VI-characteristic, as described above. Energy accumulation is estimated based on such calculated voltages and currents based on:

$$E(t) = \int_{-\infty}^{t} V(t)I_{MOV}(t)\,dt. \quad (9)$$

Before a fault occurs, no current is flowing through the MOV and the energy accumulation is zero. A good numerical approximation of eq. (9) can therefore be recursively calculated using the trapezoidal rule:

$$E(t_{k+1}) = E(t_k) + \frac{\Delta t}{2}(V(t_{k+1})I_{MOV}(t_{k+1}) + V(t_k)I_{MOV}(t_k)), \quad (10)$$

where $E(t_0)=0$.

The time step Δt corresponds to the chosen sampling rate. Due to the nonlinear VI-characteristics of the MOV, a practical sampling rate in the relay may not be sufficient for an accurate calculation of eq. (9). For example 16 samples per cycle is not sufficient. However, the ODE technique allows for detailed calculation between two samples, which provides the necessary improvement of the approximation of the energy accumulation. Once the energy accumulation is available, various protection schemes, such as a total maximum energy level or a maximum energy level over a selected sliding window, can be simulated. Such available energy accumulation also provides information on whether the installed capacitance has been bypassed by the bypass switch (FIG. 2). As soon as the installed capacitance is bypassed, the damping circuit (shown in FIG. 2 as being formed by the inductance (L) which is in parallel with the installed capacitance when the bypass switch closes) causes oscillations of the voltage across the installed capacitance. After the breaker operates, the voltage on the line side of the installed capacitance coincides with the voltage on the bus side as soon as such oscillations are damped. For practical purposes, however, such oscillations can be neglected.

Figure 4:
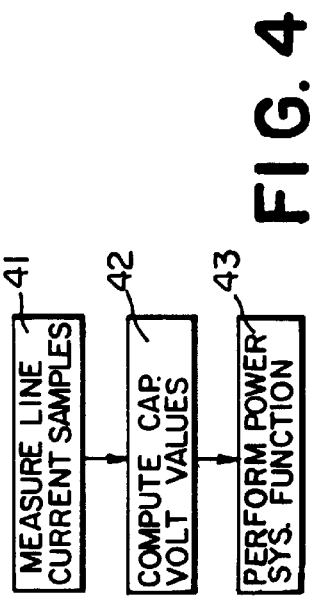
FIG. 4 is a flow chart displaying steps performed for reach measurement in accordance with a preferred embodiment of the present invention.

To perform the method of the present invention, then, and referring now to FIG. 4, a number (n) of line current samples are measured (step 41), where such samples are representative of values of a line current waveform at successive instants of time on the series-compensated line. Based on the measured line current samples, capacitance voltage values are then computed (step 42) in accordance with the above equations to take into account the non-linear protection device (i.e., the MOV) parallel to the installed series capacitance. A prescribed power system function is then performed (step 43) based on the computed capacitance voltage values. The prescribed power system function may be any function that requires knowledge of the line side voltage (which is equal to the bus side voltage minus the capacitance voltage), and can include fault impedance calculation, fault location estimation, etc. However, the line side voltage thus derived may be employed for any other purpose without departing from the spirit and scope of the present invention.

In the foregoing description, it can be seen that the present invention comprises a new and useful reach-measurement method for distance relays and fault locators on series-compensated transmission lines using local information. It will be appreciated by those skilled in the art that changes could be made to the embodiments described above without departing from the broad inventive concepts thereof. For example, in the present invention, other interpolation methods may be used to obtain intermediate current data points between samples in place of the linear interpolation. Additionally, in the present invention, a line impedance voltage drop calculation maybe performed in the case where there is a line impedance between the relay 10 and the capacitance. It is understood, therefore, that this invention is not limited to the particular embodiments disclosed but it is intended to cover modifications within the spirit and scope of the present invention as defined by the appended claims.

We claim:

1. A reach-measurement method for use in connection with a series-compensated line of a power system, the series-compensated line including an installed series capacitance having a bus side and a line side, and a non-linear protection device parallel to the installed series capacitance, the series-compensated line having a line current, a bus side voltage, and a line side voltage, the series capacitance and the non-linear protection device having a capacitance voltage thereacross equal to the bus side voltage minus the line side voltage, the method comprising the steps of:

measuring a number (n) of line current samples representative of values of a line current waveform at successive instants of time on the series-compensated line;

computing capacitance voltage values based on the measured line current samples in accordance with an equation which takes into account the non-linear protection device parallel to the installed series capacitance; and performing a prescribed power system function based on the computed capacitance voltage values, wherein the computed capacitance voltage values are determined in accordance with the following equation:

$$V_{k+1} = V_k + \frac{\Delta t}{C}(I_k - I_{NLP}(V_k));$$

wherein $V_k=V(t_k)$, the capacitance voltage at time $t_k$; $I_k=I(t_k)$, the line current at time $t_k$; $I_{NLP}(V_k)$ is the current through the non-linear protection device at voltage $V_k$; C is the installed series capacitance; Δt represents the time period separating successive samples and $t_k=k\,\Delta t$ for k=0, . . . , n.

2. The method of claim 1 wherein the computed capacitance voltage values are further determined in accordance with the following equation:

$$v_{r+1} = v_r + \frac{\tau}{C}\left(\frac{r}{m}I_{k+1} + \left(1 - \frac{r}{m}\right)I_k - I_{NLP}(v_r)\right), v_0 = V_k;$$

Wherein τ=Δt/m, a new chosen time step; and $v_r=v(t_k+r\tau)$, the voltage between two measured samples of the line current, where r=0, . . . , m, such that $V(t_k)=v_0$ and $V(t_{k+1})=v_m$.

3. The method of claim 2 wherein $I_{NLP}$ is modeled as a function of capacitance voltage by performing the steps of:

choosing an equidistant subdivision of the interval $\{v_0=0, \ldots, v_m=V_{max}\}$, where $V_{max}$ is a predetermined maximum voltage across the installed capacitance normalized by $V_{pl}$, a protective voltage level of the non-linear protective device, and where interval points $v_k$ are defined as $v_k=k\,\Delta v$ for $k=0, \ldots, m$;

constructing a data array by calculating the current $I_k=I_{NLP}(v_k)$ for each interval point $v_k$, according to:

$$I_{NLP} = k_r V_n^{\alpha_r}, \text{ with } V_n = \frac{V}{V_{pl}};$$

wherein $k_r$ and $\alpha_r$ are determined by the interval condition $V_n \in [v_r, v_{r+1}]$; and storing the constructed data array in a memory.

4. The method of claim 3 further comprising the step of computing $I_{NLP}$ as a function of capacitance voltage according to:

$$V_n = \frac{V}{V_{pl}}, s = \frac{V_n}{\Delta v}, r = \lfloor s \rfloor, \text{ and } I_{NLP} = (s-r)I_r + (r+1-s)I_{r+1};$$

wherein r is a first integer number smaller than s.

5. The method of claim 4 further comprising the step of computing energy accumulation in the non-linear protection device according to:

$$E(t_{k+1}) = E(t_k) + \frac{\Delta t}{2}(V(t_{k+1})I_{NLP}(t_{k+1}) + V(t_k)I_{NLP}(t_k));$$

where $E(t_0)=0$.

6. The method of claim 1 wherein the non-linear protection device is a voltage-limiting device limiting the capacitive voltage across the installed capacitance in a predetermined manner.

7. The method of claim 6 wherein the non-linear protection device is a metal oxide varistor (MOV).

8. A protective relay for use in connection with a series-compensated line of a power system, the series-compensated line including an installed series capacitance having a bus side and a line side, and a non-linear protection device parallel to the installed series capacitance, the series-compensated line having a line current, a bus side voltage, and a line side voltage, the series capacitance and the non-linear protection device having a capacitance voltage thereacross equal to the bus side voltage minus the line side voltage, the relay comprising:

a memory storing a number (n) of measured line current samples representative of values of a line current waveform at successive instants of time on the series-compensated line; and a processor computing capacitance voltage values based on the measured line current samples in accordance with an equation which takes into account the non-linear protection device parallel to the installed series capacitance;

wherein the relay performs a prescribed power system function based on the computed capacitance voltage values, and wherein the processor determines the capacitance voltage values in accordance with the following equation:

$$V_{k+1} = V_k + \frac{\Delta t}{C}(I_k - I_{NLP}(V_k));$$

wherein $V_k = V(t_k)$, the capacitance voltage at time $t_k$; $I_k = I(t_k)$, the line current at time $t_k$; $I_{NLP}(V_k)$ is the current through the non-linear protection device at voltage $V_k$; C is the installed series capacitance; $\Delta t$ represents the time period separating successive samples, and $t_k = k\,\Delta t$ for $k=0, \ldots n$.

9. The relay of claim 8 wherein the processor further determines the capacitance voltage values in accordance with the following equation:

$$v_{r+1} = v_r + \frac{\tau}{C}\left(\frac{r}{m}I_{k+1} + \left(1 - \frac{r}{m}\right)I_k - I_{NLP}(v_r)\right), v_0 = V_k;$$

wherein $\tau = \Delta t/m$, a new chosen time step; and $v_r = v(t_k + r\tau)$, the voltage between two measured samples of the line current, where $r = 0, \ldots, m$, such that $V(t_k) = v_0$ and $V(t_{k+1}) = v_m$.

10. The relay of claim 9 wherein the processor models $I_{NLP}$ as a function of capacitance voltage by:

choosing an equidistant subdivision of the interval $\{v_0=0, \ldots, v_m=V_{max}\}$, where $V_{max}$ is a predetermined maximum voltage across the installed capacitance normalized by $V_{pl}$, a protective voltage level of the non-linear protective device, and where interval points $v_k$ are defined as $v_k = k\,\Delta v$ for $k=0, \ldots, m$;

constructing a data array by calculating the current $I_k = I_{NLP}(v_k)$ for each interval point $v_k$, according to:

$$I_{NLP} = k_r V_n^{\alpha_r}, \text{ with } V_n = \frac{V}{V_{pl}};$$

wherein $k_r$ and $\alpha_r$ are determined by the interval condition $V_n \in [v_r, v_{r+1}]$; and storing the constructed data array in a memory.

11. The relay of claim 10 wherein the processor computes $I_{NLP}$ as a function of capacitance voltage according to:

$$V_n = \frac{V}{V_{pl}}, s = \frac{V_n}{\Delta v}, r = \lfloor s \rfloor, \text{ and } I_{NLP} = (s-r)I_r + (r+1-s)I_{r+1};$$

wherein r is a first integer number smaller than s.

12. The relay of claim 11 wherein the processor computes energy accumulation in the non-linear protection device according to:

$$E(t_{k+1}) = E(t_k) + \frac{\Delta t}{2}(V(t_{k+1})I_{NLP}(t_{k+1}) + V(t_k)I_{NLP}(t_k));$$

where $E(t_0)=0$.

13. The relay of claim 8 wherein the non-linear protection device is a voltage-limiting device limiting the capacitive voltage across the installed capacitance in a predetermined manner.

14. The relay of claim 13 wherein the non-linear protection device is a metal oxide varistor (MOV).

15. A power system comprising a series-compensated line and a protective relay, the series-compensated line including an installed series capacitance having a bus side and a line side, and a non-linear protection device parallel to the installed series capacitance, the series-compensated line having a line current, a bus side voltage, and a line side voltage, the series capacitance and the non-linear protection device having a capacitance voltage thereacross equal to the bus side voltage minus the line side voltage, the relay comprising:
a memory storing a number (n) of measured line current samples representative of values of a line current waveform at successive instants of time on the series-compensated line; and
a processor computing capacitance voltage values based on the measured line current samples in accordance with an equation which takes into account the non-linear protection device parallel to the installed series capacitance;
wherein the relay performs a prescribed power system function based on the computed capacitance voltage values, and
wherein the processor determines the capacitance voltage values in accordance with the following equation:

$$V_{k+1} = V_k + \frac{\Delta t}{C}(I_k - I_{NLP}(V_k));$$

wherein $V_k=V(t_k)$, the capacitance voltage at time $t_k$; $I_k=I(t_k)$, the line current at time $t_k$; $I_{NLP}(V_k)$ is the current through the non-linear protection device at voltage $V_k$; C is the installed series capacitance, $\Delta t$ represents the time period separating successive samples, and $t_k=k \Delta t$ for $k=0, \ldots, n$.

16. The power system of claim 15 wherein the processor further determines the capacitance voltage values in accordance with the following equation:

$$v_{r+1} = v_r + \frac{\tau}{C}\left(\frac{r}{m}I_{k+1} + \left(1 - \frac{r}{m}\right)I_k - I_{NLP}(v_r)\right), v_0 = V_k;$$

wherein $\tau=\Delta t/m$, a new chosen time step; and $v_r=v(t_k+r\tau)$, the voltage between two measured samples of the line current, where $r=0, \ldots, m$, such that $V(t_k)=v_0$ and $V(t_{k+1})=v_m$.

17. The power system of claim 16 wherein the processor models $I_{NLP}$ as a function of capacitance voltage by:
choosing an equidistant subdivision of the interval $\{v_0=0, \ldots, v_m=V_{max}\}$, where $V_{max}$ is a predetermined maximum voltage across the installed capacitance normalized by $V_{pl}$, a protective voltage level of the non-linear protective device, and where interval points $v_k$ are defined as $v_k=k \Delta v$ for $k=0, \ldots, m$;
constructing a data array by calculating the current $I_k=I_{NLP}(v_k)$ for each interval point $v_k$, according to:

$$I_{NLP} = k_r V_n^{\alpha_r}, \text{ with } V_n = \frac{V}{V_{pl}};$$

wherein $k_r$ and $\alpha_r$ are determined by the interval condition $V_n \in [v_r, v_{r+1}]$; and
storing the constructed data array in a memory.

18. The power system of claim 17 wherein the processor computes $I_{NLP}$ as a function of capacitance voltage according to:

$$V_n = \frac{V}{V_{pl}}, s = \frac{V_n}{\Delta v}, r = \lfloor s \rfloor, \text{ and } I_{NLP} = (s-r)I_r + (r+1-s)I_{r+1};$$

wherein r is a first integer number smaller than s.

19. The power system of claim 18 wherein the processor computes energy accumulation in the non-linear protection device according to:

$$E(t_{k+1}) = E(t_k) + \frac{\Delta t}{2}(V(t_{k+1})I_{NLP}(t_{k+1}) + V(t_k)I_{NLP}(t_k));$$

where $E(t_0)=0$.

20. The power system of claim 15 wherein the non-linear protection device is a voltage-limiting device limiting the capacitive voltage across the installed capacitance in a predetermined manner.

21. The power system of claim 20 wherein the non-linear protection device is a metal oxide varistor (MOV).

* * * * *

UNITED STATES PATENT AND TRADEMARK OFFICE
CERTIFICATE OF CORRECTION

PATENT NO. : 6,336,059 B1
DATED : January 1, 2002
INVENTOR(S) : Damir Novosel et al.

It is certified that error appears in the above-identified patent and that said Letters Patent is hereby corrected as shown below:

Column 1,
Line 34, "arc" should read -- are --

Column 5,
Line 8, "step At due" should read -- step $\Delta$t due --

Signed and Sealed this

Eleventh Day of June, 2002

Attest:

JAMES E. ROGAN
Attesting Officer  Director of the United States Patent and Trademark Office